United States Patent [19]

Carlyle

[11] Patent Number: 5,013,285
[45] Date of Patent: May 7, 1991

[54] CHAIN CONTROL APPARATUS

[76] Inventor: James P. Carlyle, 3153 Ames, Denver, Colo. 80214

[21] Appl. No.: 578,726

[22] Filed: Sep. 6, 1990

Related U.S. Application Data

[63] Continuation-in-part of Ser. No. 512,898, Apr. 23, 1990, which is a continuation of Ser. No. 263,348, Oct. 17, 1988, Pat. No. 4,919,644.

[51] Int. Cl.$^5$ ............................................ F16H 11/08
[52] U.S. Cl. ...................................... 474/80; 280/250; 474/82
[58] Field of Search ................................... 474/77–82; 280/250, 261, 263, 285, 286, 289 R

[56] References Cited

U.S. PATENT DOCUMENTS

| | | | |
|---|---|---|---|
| 4,599,079 | 7/1986 | Chappell | 474/82 X |
| 4,637,808 | 1/1987 | Nakamura | 474/80 |
| 4,900,291 | 2/1990 | Patterson | 474/80 |
| 4,919,644 | 4/1990 | Carlyle | 474/80 |

Primary Examiner—Thuy M. Bui
Attorney, Agent, or Firm—Klaas & Law

[57] ABSTRACT

Chain control apparatus is provided for a bicycle having a chain journaled around spaced apart gears so as to have an upper run and a lower run wherein the chain control apparatus limits movement of the lower run in directions away from the upper run when the bicycle is operated in rough terrain or is used in jumping operations and wherein the chain control apparatus is mounted for permitting pivotal movement thereof around a generally horizontal axis and around at least one generally vertical axis.

20 Claims, 4 Drawing Sheets

CHAIN CONTROL APPARATUS

This application is a continuation-in-part of U.S. Pat. application Ser. No. 512,898 filed Apr. 23, 1990, which application is a continuation of U.S. Pat. application Ser. No. 263,348 filed Oct. 17, 1988, now U.S. Pat. No. 4,919,644 dated Apr. 24, 1990.

FIELD OF THE INVENTION

This invention is directed generally to the operation of the chain system for a bicycle or other similar vehicles and more particularly for control apparatus for providing protection for the lower run of the chain drive means.

BACKGROUND OF THE INVENTION

Bicycles have been and still are one of the more popular forms of sports and transportation equipment. The chain drive means in a bicycle is used to transmit the power placed on the driving sprocket by the user to the driven wheel of the bicycle which generally is the rear wheel. In many instances, the driven wheel is provided with a plurality of different sized gears so that the user may use a shift mechanism so as to rotate the driven wheel at different speeds and is commonly referred to as a derailer system such as that described in U.S. Pat. No. 4,343,613 to Leiter et al. It is very essential that the chain drive means used on bicycles equipped with a derailer system be kept clean from deleterious materials which would prevent the proper operation of the chain drive means. This is particular true when the bicycle is operated in rough terrain or when the bicycle is used in jumping operations that result in a force being applied to the lower run of the chain system. In many instances, the weight of the chain and the force applied thereto will be more than enough to overcome the tension applying means of the derailer system so that the lower run of the chain will strike the terrain and have deleterious materials attached thereto.

BRIEF DESCRIPTION OF THE INVENTION

This invention provides chain control apparatus for providing control means for the lower run of the chain drive means of a vehicle so that the lower run will not contact the terrain when the vehicle is operated in rough terrain or is used in jumping operations.

In the preferred embodiment of the invention, the vehicle is a bicycle that has a frame on which are mounted a rotatable driven wheel, a plurality of gear means for rotating the driven wheel at different speeds, rotatable driving means having at least one gear means mounted thereon for rotation therewith, support means mounted on said driving means so that an user may contact the support means and rotate the driving means and at least one chain drive means journaled around at least one of the plurality of gear means and the at least one gear means of said driving means so that the at least one chain drive means has an upper run and a lower run. A rotatable idler sprocket means is securely mounted on the bicycle frame so that the plurality of gear means, the at least one gear means and the idler sprocket means rotate about axes which are in a generally parallel relationship. At least a portion of the lower run is in contact with and supported by at least a portion of the idler sprocket means. The idler sprocket means functions to divide the lower run into a first section having upper and lower sides and having at least a portion thereof next adjacent to its contact with the idler sprocket means extending generally in a linear direction and a second section having upper and lower sides and having at least a portion thereof next adjacent to its contact with the idler sprocket means extending generally in a linear direction. The idler sprocket means is mounted so that the lower side of the first section meets with the lower side of the second section to form an included angle of less than 180 degrees. Movement permitting means connect the idler sprocket means to the mounting means to permit displacement of the idler sprocket means while maintaining the parallel relationship of the axes of the plurality of gear means, the at least one gear means and the idler sprocket means and preferably comprises a parallel motion mechanism.

In another preferred embodiment of the invention, the chain control means are mounted to permit pivotal movement thereof around a generally horizontal axis and around at least one vertical axis. In this embodiment, a support block is attached to the bicycle frame. A first control arm is mounted on the support block for movement around a fixed generally horizontal axis extending in a direction generally parallel to the lower run and is connected to the chain control means by a universal joint. A second control arm is connected to the support block and to the chain control means by universal joints at locations spaced from the mounting places of the first control arm. A third control arm is connected to the support block and to the chain control means by universal joints at locations spaced from the mounting places of the first and second control arms. The mounting of the first control arm for movement around the fixed axis prevents pivotal movement of the chain control means toward or away from the plurality of gear means.

BRIEF DESCRIPTION OF THE DRAWINGS

Illustrative and presently preferred embodiments of the invention are shown in the accompanying drawing in which.

DETAILED DESCRIPTION OF THE INVENTION

Figure 1:
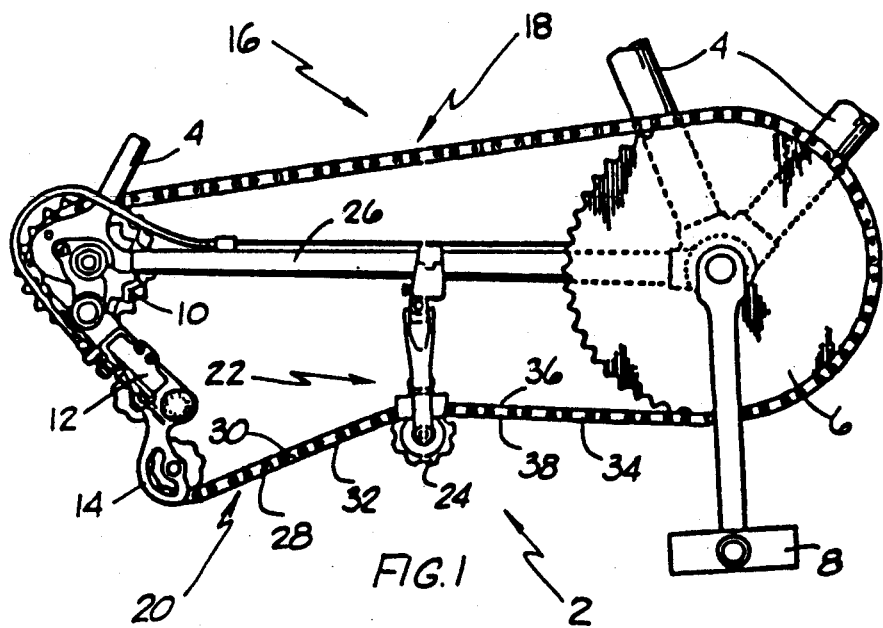
FIG. 1 is a side elevational view of the driving mechanism of a bicycle and illustrates one preferred embodiment of the invention.

In FIG. 1, there is illustrated the driving mechanism of a bicycle 2 comprising a frame 4 having a driving means comprising a gear means 6 rotatably mounted on the frame 4 and a pedal 8 for rotating the gear means 6. A plurality of gear means 10 are mounted on the frame 4 for rotating a conventional rear wheel (not shown) at different speeds. A conventional guide sprocket wheel 12 and a tensioning means 14 are provided and function in a conventional manner. A chain drive means 16 is journaled around at least one of the plurality of gear means 10 and the gear means 6 so that the chain drive means 16 has an upper run 18 and a lower run 20.

The chain control means 22 comprises an idler sprocket means 24 which is mounted on the chain stay means 26 extending between the gear means 6 and the plurality of gear means 10 by mounting means, described more fully below, so that the plurality of gear means 10, the gear means 6 and the idler sprocket means 24 rotate about axes which are in a parallel relationship. The lower run 20 is in contact with and supported by the idler sprocket means 24 so as to divide the lower run 20 into a first section 28 having upper 30 and lower 32 sides with at least a portion of the lower side 32 next adjacent to its contact with the idler sprocket means 24 extending in a linear direction and a second section 34 having upper 36 and lower 38 sides with at least a portion of the lower side 38 next adjacent to its contact with the idler sprocket means 24 extending in a linear direction. As illustrated in FIG. 1, the lower side 32 of the first section 28 meets with the lower side 38 of the second section 34 to form an included angle of less than 180 degrees. If desired, the lower run 20 in one position between the plurality of gear means 10 and the gear means 6 can extend completely in a linear direction and the idler sprocket means 24 can be located immediately below the lower run 20 so that contact between the idler sprocket means 24 and the lower run 20 would only occur to prevent undesirable downward movement of the lower run 20. Also, if desired, the idler sprocket means 24 could comprise chain receiving guide means formed from a material having a low coefficient of friction such as tetrafluroethylene resin.

Figure 4:
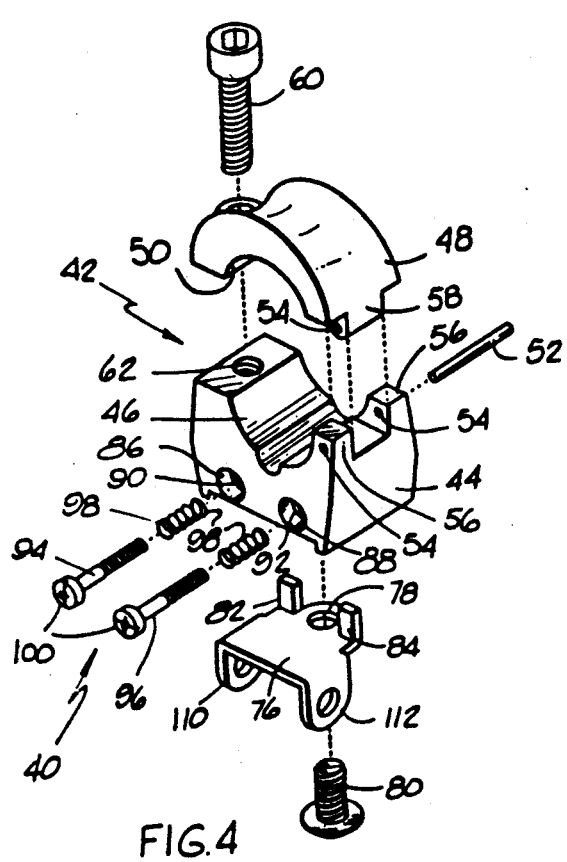
FIG. 4 is an exploded view of the mounting system of FIG. 2.
Figure 5:
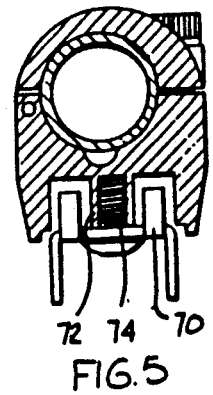
FIG. 5 is a cross-sectional view of a portion of FIG. 2.
Figure 6:
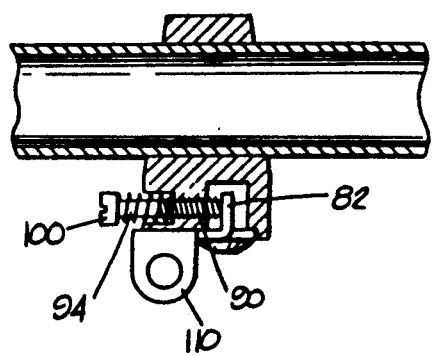
FIG. 6 is a cross-sectional view of a portion of FIG. 2.

The mounting system 40 for mounting the idler sprocket means 24 on the chain stay means 26 is illustrated in FIG. 4 and comprises clamping means 42 having a lower portion 44 having an inner surface configuration 46 corresponding to the surface of the chain stay means 26 that it is adapted to contact and an upper portion 48 having an inner surface configuration 50 corresponding to the surface of the chain stay means 26 that it is adapted to contact. The upper portion 48 is pivotally mounted on the lower portion 44 by a pivot pin 52 which extends through openings 54 in the upstanding ears 56 on the lower portion 44 and the depending lug 58 on the upper portion 48. A threaded bolt 60 is mounted in the threaded opening 62 and is tightened therein to apply forces on the upper portion 48 so as to clamp the chain stay means securely between the upper 48 and lower 44 portions.

The lower portion 44 has a hollow interior 70 and a depending stud 72 having a threaded opening 74. A plate member 76 has an opening 78 through which a threaded bolt 80 passes and is threaded into the threaded opening 74 so as to mount the plate member 76 for pivotal movement. The plate member 76 has a pair of spaced apart upstanding ears 82 and 84. The lower portion 44 has a pair of spaced apart recesses 86 and 88 having threaded openings 90 and 92. A pair of threaded bolts 94 and 96 extend through the threaded openings 90 and 92 and contact the upstanding ears 82 and 84 so that the adjustment of the threaded bolts 94 and 96 will pivot the plate member 76 to a position wherein the idler sprocket means 24 is properly aligned with the lower run 20. After the alignment is made, the threaded bolts 94 and 96 in contact with the upstanding ears 82 and 84 function to hold the plate member 76 in its desired location. Springs 98 are located between the recesses 86 and 88 and the heads 100 of the threaded bolts 94 and 96.

Figure 3:
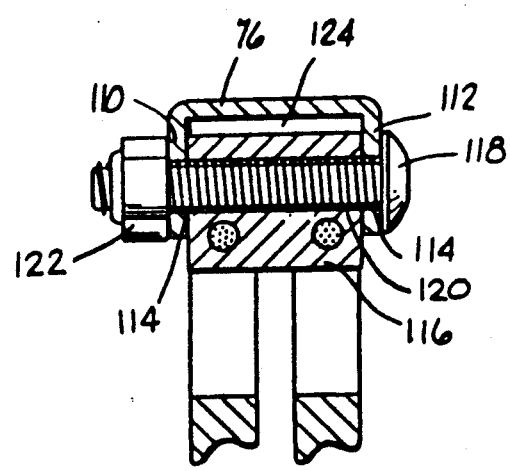
FIG. 3 is a cross-sectional view of a portion of FIG. 2.

Means for preventing breakage of the idler sprocket means 24 and its mounting structure is illustrated in FIG. 3. The plate member 76 has a pair of depending ears 110 and 112 having openings 114. A mounting block 116 is located between the depending ears 110 and 112 and is dimensioned so as to be in surface to surface contact therewith. A threaded bolt 118 extends through the opening 114 in the depending ear 112, an opening 120 in the mounting block 116 and a nut 122 is used to apply frictional forces between the ears 110 and 112 and the mounting block 116. A space 124 exists between mounting block 118 and the plate 76 so that it may rotate around the threaded bolt 118. During assembly, the threaded bolt 118 is tightened to apply pressure to the depending ears 110 and 112 so that the contact of the depending ears 110 and 112 on the surface of the mounting block 116 will hold the mounting block 116 to prevent rotation of the mounting block 116 during normal operation thereof but will permit rotation of the mounting block 116 if the idler sprocket means 24 strikes a solid object so as to prevent breakage of the idler sprocket means 24 and its mounting structure.

Figure 2:
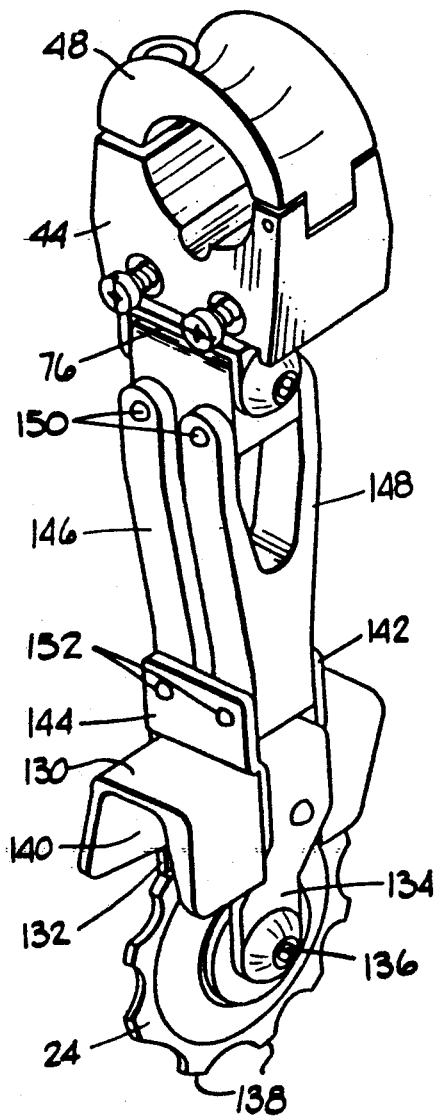
FIG. 2 is a perspective view of one preferred embodiment of the chain control apparatus of this invention.

The mounting means for the idler sprocket means 24 is illustrated in FIG. 2. A U-shaped support bracket 130 has a pair of spaced apart mounting arms 132 and 134 having openings therein through which a mounting bolt 136 extends. The idler sprocket means 24 is mounted between the mounting arms 132 and 134 for rotation on the mounting bolt 136. The idler sprocket means 24 has a plurality of teeth 138 adapted to contact the lower run 20 so as to rotate the idler sprocket means 24. A clearance space 140 exists between the top of the idler sprocket means 24 and the U-shaped support bracket 130 to provide for the passage of the lower run 20 therethrough. The U-shaped support bracket 130 has a pair of spaced apart upstanding mounting lugs 142 and 144. A pair of control arms 146 and 148 are pivotally mounted on the mounting block 116 and the pair of mounting lugs 142 and 144 by pivot means 150 and 152. This pivotal mounting of the control arms 146 and 148 provides a parallel motion mechanism for the control arms 146 and 148 so that the idler sprocket means 24 is free to move while the rotational axis thereof remains parallel to the rotational axes of the gear means 6 and the plurality of gear means 10.

Figure 7:
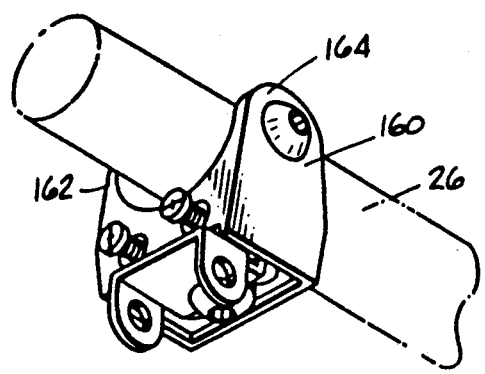
FIG. 7 is a view of another embodiment of the mounting system.
Figure 8:
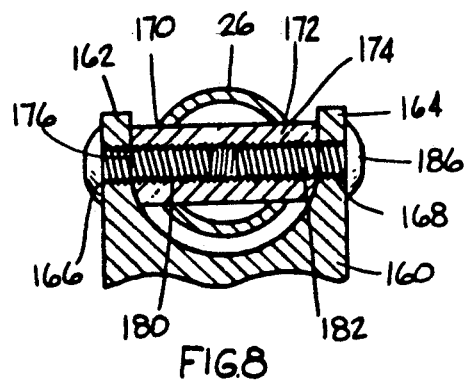
FIG. 8 is a cross-sectional view of a portion of FIG. 7.
Figure 9:
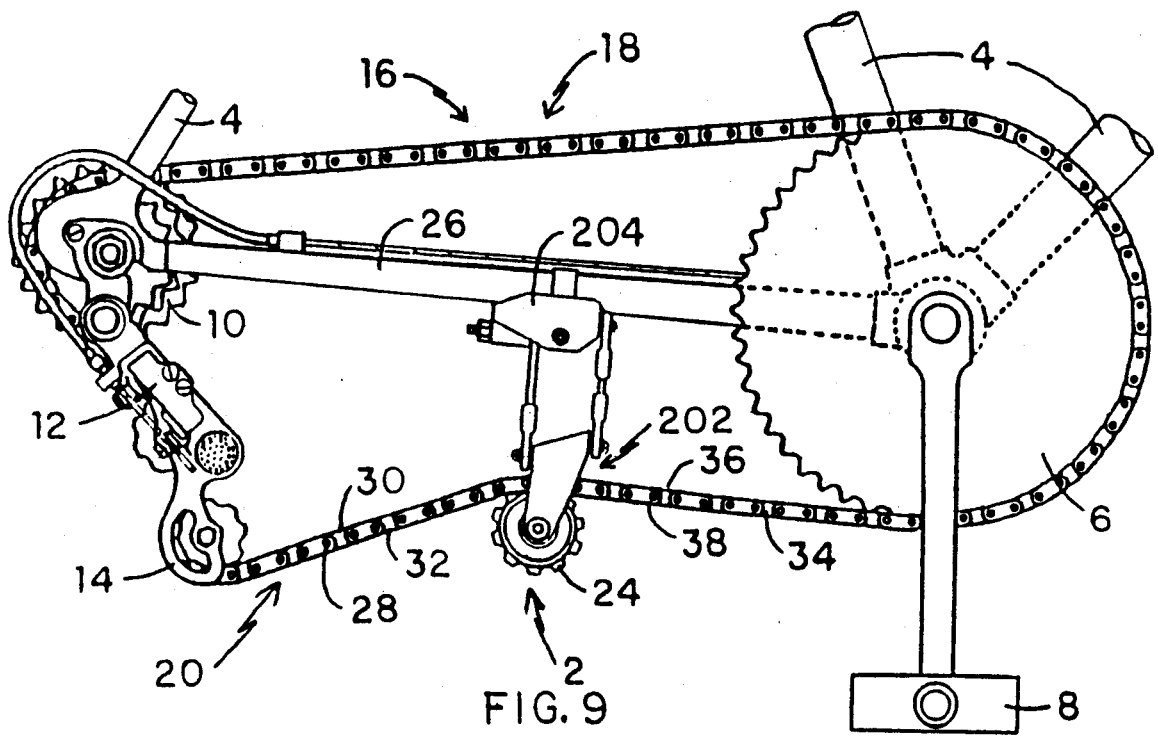
FIG. 9 is a side elevational view of the driving mechanism of a bicycle and illustrates another preferred embodiment of the invention.

Another embodiment of the mounting system 40 is illustrated in FIGS. 7 and 8. A mounting member 160 has a pair of spaced apart upstanding mounting lugs 162 and 164 having threaded openings 166 and 168. A pair of aligned openings 170 and 172 are formed in the chain stay means 26 and a mounting stud 174 having a threaded opening 176 extending therethrough passes through the aligned openings 170 and 172. Threaded bolts 180 and 182 extend through the openings 166 and 168 and are in threaded engagement with the threaded opening 176 so that the bolts 180 and 182 may be tightened to clamp the mounting lugs 162 and 164 between the heads 184 and 186 of the threaded bolts 180 and 182 and the mounting stud 174.

Figure 10:
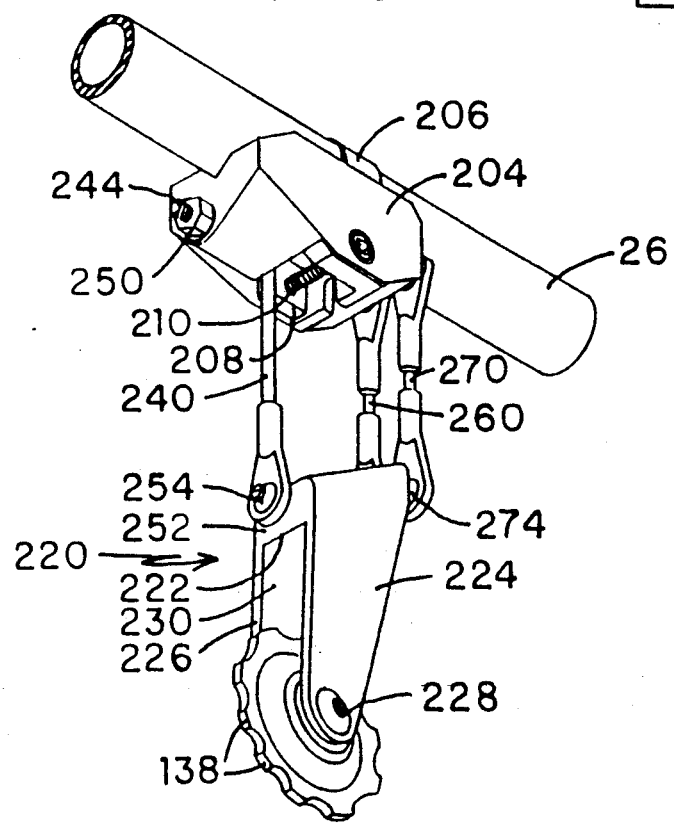
FIG. 10 is a perspective view of the another preferred embodiment of this invention.
Figure 11:
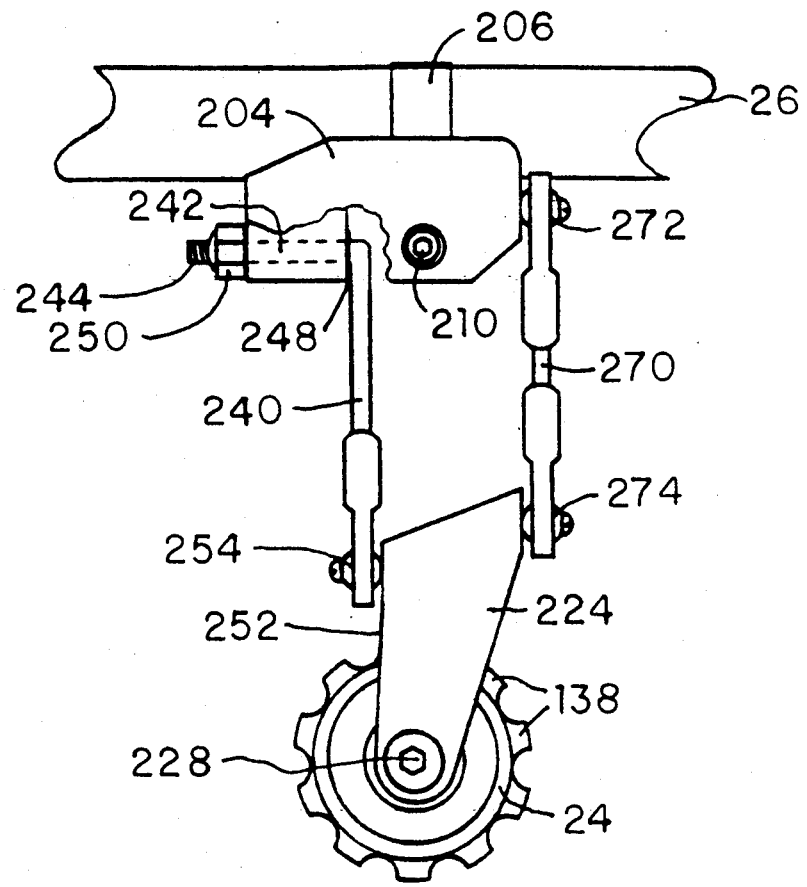
FIG. 11 is a side elevational view of FIG. 10 with parts broken away.
Figure 12:
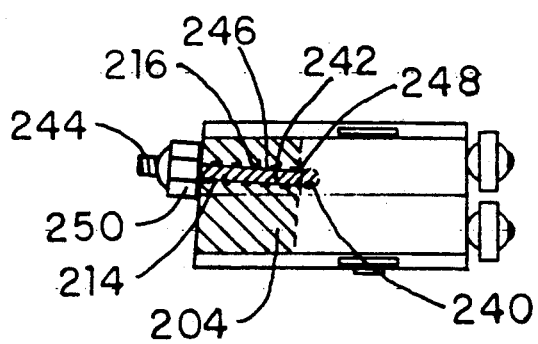
FIG. 12 is a top plan view of a portion of FIG. 11 with parts in section.

Another preferred embodiment of the invention is illustrated in FIGS. 9-13 and in which parts corresponding to those illustrated in FIGS. 1-8 have been given the same reference numerals. The chain control means 202 are mounted on a support block 204 which is mounted at a fixed location on the chain stay means 26 by a strap 206 which has end portions 208 which are secured to the support block 204 by a threaded bolt 210 which, when tightened, pulls the bifurcated portions 212, FIG. 13, together so that the chain stay means 26 are securely clamped therebetween. If desired, the support block 204 may be secured to the chain stay means 26 by other types of apparatus such as those illustrated in FIGS. 2 and 4 or in FIGS. 7 and 8. As illustrated in FIG. 12, the support block 204 has an elongated opening 214 extending therethrough so that, when the support block 204 is fixedly mounted on the chain stay means 26, the elongated opening 214 extends in a direction generally parallel to the lower run 20. The elongated opening 214 has a generally cylindrical inner surface 216.

Figure 13:
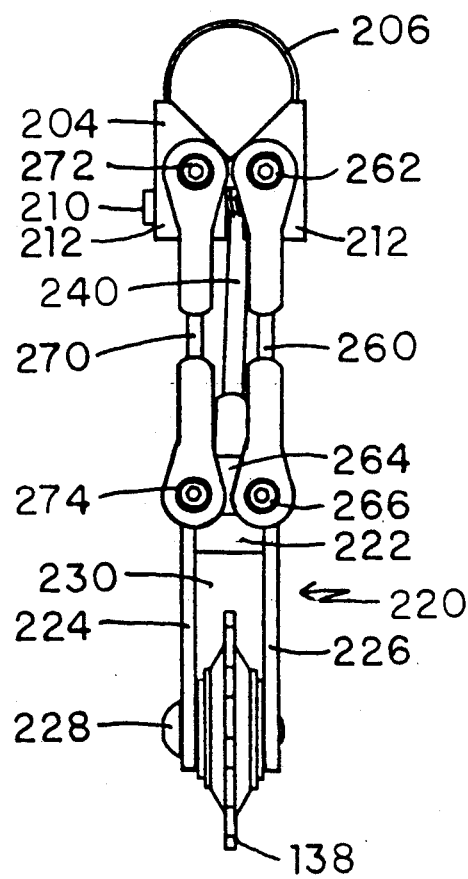
FIG. 13 is an elevational view taken from the right side of FIG. 11.

The mounting for the chain control guide means 202 is illustrated in FIGS. 10, 11 and 13. An inverted U-shaped support bracket 220 has a base portion 222 and spaced apart depending mounting arms 224 and 226 having openings therein through which a mounting bolt 228 extends. The idler sprocket means 24 are mounted between the mounting arms 224 and 226 for rotation on the mounting bolt 228 and have a plurality of teeth 138 adapted to contact the lower run 20 to be rotated thereby. A clearance space 230 exists between the base portion 222 and the top of the idler sprocket means 24 to provide for the passage of the lower run 20 therethrough.

A first control arm 240 has an integral portion 242 having a threaded end portion 244. The integral portion 242 preferably forms an angle of about 90 degrees with the first control arm 240. The integral portion 242 extends through the elongated opening 214 and has a generally cylindrical outer surface 246 so that the integral portion 242 may have pivotal movement on the generally cylindrical inner surface 216. A washer 248 permits the pivotal movement of the integral portion 242. A lock nut 250 is used to retain the integral portion 242 in the elongated opening 214 while permitting the pivotal movement thereof. The integral portion 242 in the elongated opening 214 prevents pivotal movement of the first control arm 240 in directions toward or away from the plurality of gear means 10. The first control arm 240 is connected to one side 252 of the base portion 222 by a universal joint 254 to provide for pivotal movement therebetween around a plurality of axes.

A second control arm 260 is connected to the support block 204 by a universal joint 262 to provide for pivotal movement therebetween around a plurality of axes and to the other side 264 of the base portion 222 by a universal joint 266 to provide for pivotal movement therebetween around a plurality of axes.

A third control arm 270 is connected to the support block 204 by a universal joint 272 to provide for pivotal movement therebetween around a plurality of axes and to the other side 264 of the base portion 222 by a universal joint 274 to provide for pivotal movement therebetween around a plurality of axes.

In FIGS. 9-13, the support block 204 is mounted on the chain stay means 26 so that the first control arm 240 is closer to the plurality of gear means 10 than the second and third control arms 260 and 270. However, the support block 204 can be designed so that, when mounted on the chain stay means 26, the second and third control arms 260 and 270 are closer to the plurality of gear means 10 than the first control arm 240.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for use with a bicycle to control undesirable chain travel comprising:
   a bicycle frame;
   at least one driven wheel;
   a plurality of gear means for rotating said at least one driven wheel at different speeds;
   driving apparatus rotatably mounted on said bicycle frame and having at least one gear mounted thereon for rotation therewith;
   support means mounted on said driving means so that a user may contact said support means and rotate said driving apparatus;
   at least one chain drive means journaled around at least one of said plurality of gear means and said at least one gear of said driving apparatus so that said at least one chain drive means has an upper run and a lower run and drives said plurality of gear means;
   said upper and lower runs lying generally in the same plane;
   chain tensioning means for maintaining the proper tension on said at least one chain drive means;
   chain control means for controlling the movement of said chain drive means and having an opening extending therethrough;
   mounting means for mounting said chain control means on said bicycle frame so that said lower run passes through said opening;
   said chain control means having a support surface adapted to be contacted by said lower run so as to limit movement of said lower run in a direction away from said upper run; and
   movement permitting means for permitting pivotal movement of said chain control means around a generally horizontal axis extending generally in the direction between said plurality of gear means and said driving apparatus and around at least one generally vertical axis.

2. Apparatus as in claim 1 wherein:
   said support surface comprising an idler sprocket rotatably mounted on said chain control means.

3. Apparatus as in claim 1 wherein said mounting means comprises:
   a support block;
   attachment means for fixedly attaching said support block to said bicycle frame;
   a first control arm pivotally mounted on said support block and on said chain control means;
   a second control arm pivotally mounted on said support block and on said chain control means at locations spaced from the mounting places of said first control arm; and at least a third control arm pivotally mounted on said support block and on said chain control means at locations spaced from the mounting places of said first and second control arms.

4. Apparatus as in claim 3 and further comprising:

first pivot means for mounting said first control arm to said support block for movement about said generally horizontal axis; and second pivot means for mounting said first control arm to said chain control means for movement about a plurality of axes.

5. Apparatus as in claim 4 wherein:

said first pivot means comprise an elongated opening extending through at least a portion of said support block in a generally horizontal direction and a portion of said first control arm pivotally mounted in said opening; and said second pivot means comprises a universal joint between said first control arm and said chain control means.

6. Apparatus as in claim 5 wherein:

said opening having a longitudinal axis extending in a direction generally parallel to said upper and lower runs.

7. Apparatus as in claim 3 and further comprising:

third pivot means for mounting said second control arm to said support block for movement about a plurality of axes;

fourth pivot means for mounting said second control arm to said chain control means for movement about a plurality of axes;

fifth pivot means for mounting said third control arm to said support block for movement about a plurality of axes; and sixth pivot means for mounting said third control arm to said chain control means for movement about a plurality of axes.

8. Apparatus as in claim 7 wherein:

each of said third, fourth, fifth and sixth pivot means comprise a universal joint.

9. Apparatus as in claim 8 and further comprising:

first pivot means for mounting said first control arm to said support block for movement about a fixed axis; and second pivot means for mounting said first control arm to said chain control means for movement about a plurality of axes.

10. Apparatus as in claim 9 wherein:

said first pivot means preventing pivotal movement of said chain control means toward or away from said plurality of gear means.

11. Apparatus as in claim 8 and further comprising:

first pivot means for mounting said first control arm to said support block for movement about a fixed axis; and second pivot means for mounting said first control arm to said chain control means for movement about a plurality of axes.

12. Apparatus as in claim 11 wherein:

said first pivot means preventing pivotal movement of said chain control means toward or away from said plurality of gear means.

13. Apparatus for use with a bicycle to control undesirable chain travel comprising:

a bicycle frame;

at least one driven wheel;

a plurality of gear means for rotating said at least one driven wheel at different speeds;

driving apparatus rotatably mounted on said bicycle frame for rotating said at least one driven wheel and having at least one gear means mounted thereon for rotation therewith;

support means mounted on said driving apparatus so that a user may contact said support means and rotate said driving apparatus;

at least one chain drive journaled around at least one of said plurality of gear means and said at least one gear means of said driving means so that said at least one chain drive has an upper run and a lower run;

said upper and lower runs lying generally in the same plane;

chain tensioning means for maintaining the proper tension on said at least one chain drive;

chain control means for controlling said chain control means and having an opening extending therethrough;

mounting means for mounting said chain control means on said bicycle frame so that said lower run passes through said opening;

at least a portion of said lower run being in contact with and supported by at least a portion of said chain control means;

said chain control means providing a support surface to prevent contact of said lower run with the terrain over which the bicycle is operating;

said chain control means dividing said lower run into a first section having upper and lower sides and having at least a portion thereof next adjacent to its contact with said chain control means extending generally in a linear direction and a second section having upper and lower sides and having at least a portion thereof next adjacent to its contact with said chain control means extending generally in a linear direction;

said lower side of said first section meeting with said lower side of said second section to form an included angle of less than 180 degrees; and movement permitting means for permitting pivotal movement of said chain control means around a generally horizontal axis extending generally in the direction between said plurality of gear means and said driving apparatus and at least one generally vertical axis.

14. Apparatus as in claim 13 wherein:

said support surface comprising an idler sprocket rotatably mounted on said chain control guide means.

15. Apparatus as in claim 13 wherein said mounting means comprises:

a support block;

attachment means for fixedly attaching said support block to said bicycle frame;

a first control arm pivotally mounted on said support block and on said chain control means;

a second control arm pivotally mounted on said support block and on said chain control means at locations spaced from the mounting places of said first control arm; and at least a third control arm pivotally mounted on said support block and on said chain control means at locations spaced from the mounting places of said first and second control arms.

16. Apparatus as in claim 15 and further comprising:

first pivot means for mounting said first control arm to said support block for movement about a fixed axis; and second pivot means for mounting said first control arm to said chain control means for movement about a plurality of axes.

17. Apparatus as in claim 16 wherein:

said first pivot means comprise an elongated opening extending through at least a portion of said support block in a generally horizontal direction and a portion of said first control arm pivotally mounted in said opening; and said second pivot means comprises a universal joint between said first control arm and said chain control means.

18. Apparatus as in claim 17 wherein:

said opening having a longitudinal axis extending in a direction generally parallel to said upper and lower runs.

19. Apparatus as in claim 15 and further comprising:

third pivot means for mounting said second control arm to said support block for movement about a plurality of axes;

fourth pivot means for mounting said second control arm to said chain control means for movement about a plurality of axes;

fifth pivot means for mounting said third control arm to said support block for movement about a plurality of axes; and sixth pivot means for mounting said third control arm to said chain control means for movement about a plurality of axes.

20. Apparatus as in claim 19 wherein:

each of said third, fourth, fifth and sixth pivot means comprise a universal joint.

* * * * *